United States Patent
Homan et al.

(10) Patent No.: US 6,927,578 B2
(45) Date of Patent: *Aug. 9, 2005

(54) DETECTION OF BOREHOLE CURRENTS DUE TO A DECENTERED TRANSVERSE MAGNETIC DIPOLE TRANSMITTER

(75) Inventors: Dean M. Homan, Sugar Land, TX (US); Dzevat Omeragic, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/248,119

(22) Filed: Dec. 19, 2002

(65) Prior Publication Data

US 2004/0119476 A1 Jun. 24, 2004

(51) Int. Cl.[7] .................................................. G01V 3/18
(52) U.S. Cl. ........................ 324/342; 324/355; 324/356; 324/366; 324/339
(58) Field of Search ................................ 324/338, 339, 324/342, 343, 354, 355, 356, 358, 366

(56) References Cited

U.S. PATENT DOCUMENTS

| | | |
|---|---|---|
| 3,305,771 A | 2/1967 | Arps |
| 3,329,889 A | 7/1967 | Tanguy |
| 3,388,325 A | 6/1968 | Birdwell et al. |
| 3,760,260 A | 9/1973 | Schuster |
| 4,538,109 A | 8/1985 | Clark |
| 4,873,488 A | 10/1989 | Barber et al. |
| 5,041,975 A * | 8/1991 | Minerbo et al. ................ 702/7 |
| 5,058,077 A * | 10/1991 | Twist ........................... 367/25 |
| 5,235,285 A | 8/1993 | Clark et al. |
| 5,260,662 A * | 11/1993 | Rorden ........................ 324/339 |
| 5,339,037 A | 8/1994 | Bonner et al. |
| 5,396,175 A | 3/1995 | Seeman |
| 5,426,368 A | 6/1995 | Benimeli et al. |
| 6,373,254 B1 * | 4/2002 | Dion et al. .................. 324/369 |
| 6,541,979 B2 * | 4/2003 | Omeragic ................... 324/339 |
| 6,573,722 B2 * | 6/2003 | Rosthal et al. .............. 324/338 |

FOREIGN PATENT DOCUMENTS

| | | |
|---|---|---|
| GB | 2374937 | 10/2002 |
| GB | 2376076 | 12/2002 |

* cited by examiner

*Primary Examiner*—Jay Patidar
(74) *Attorney, Agent, or Firm*—Kevin P. McEnaney; Victor H. Segura; Brigitte L. Echols (57) ABSTRACT

The invention provides an apparatus for making an electromagnetic measurement from within a subsurface borehole. The apparatus comprises an elongated support having electrically conductive segments and adapted for disposal within the borehole; an antenna adapted to transmit electromagnetic energy disposed on the support such that its axis is tilted or perpendicular with respect to the axis of the support; a sensor disposed on the support and adapted to detect a current flow along the support when the antenna is activated to transmit electromagnetic energy; and means to process the detected current flow to provide an indication of the measurement quality or the position of the support within the borehole.

29 Claims, 5 Drawing Sheets

DETECTION OF BOREHOLE CURRENTS DUE TO A DECENTERED TRANSVERSE MAGNETIC DIPOLE TRANSMITTER

BACKGROUND OF INVENTION

1. Field of the Invention

The invention concerns techniques to assess the electromagnetic effects associated with the deployment of antennas having transverse or tilted axes within a borehole. More particularly, the invention relates to techniques for detecting or monitoring the borehole effect encountered in subsurface measurements.

2. Description of Related Art

Various well logging techniques are known in the field of hydrocarbon exploration and production. These techniques typically employ logging instruments or "sondes" equipped with sources adapted to emit energy through a borehole traversing the subsurface formation. The emitted energy interacts with the surrounding formation to produce signals that are detected and measured by one or more sensors on the instrument. By processing the detected signal data, a profile or log of selected physical parameters of the formation properties is obtained.

Electromagnetic (EM) logging techniques known in the art include "wireline" logging and logging-while-drilling (LWD). Wireline logging entails lowering the instrument into the borehole at the end of an armored electrical cable to obtain the subsurface measurements as the instrument is moved along the borehole. LWD entails attaching the instrument disposed in a drill collar to a drilling assembly while a borehole is being drilled through earth formations.

Conventional wireline and LWD instruments are implemented with antennas that are operable as sources and/or sensors. In wireline applications, the antennas are typically enclosed by a housing constructed of a tough plastic material composed of a laminated fiberglass material impregnated with epoxy resin. In LWD applications, the antennas are generally mounted on a metallic support to withstand the hostile environment encountered during drilling. Conventional logging instruments are also being constructed of thermoplastic materials that provide a non-conductive structure for mounting the antennas.

In both wireline and LWD applications, the antennas are mounted on the support member and axially spaced from each other in the direction of the borehole. These antennas are generally coils of the cylindrical solenoid type and are comprised of one or more turns of insulated conductor wire that is wound around the support. U.S. Pat. Nos. 4,873,488 and 5,235,285 (both assigned to the present assignee), for example, describe instruments equipped with antennas disposed along a central metallic support. In operation, the transmitter antenna is energized by an alternating current to emit EM energy through the borehole fluid ("mud") and into the formation. The signals detected at the receiver antenna are usually expressed as a complex number (phasor voltage) and reflect interaction with the mud and the formation.

One EM logging technique investigates subsurface formations by obtaining electrical resistivity or conductivity logs by "focused" measurements. U.S. Pat. No. 3,305,771 describes a focusing technique using an instrument equipped with toroidal coils. U.S. Pat. Nos. 5,235,285 and 5,339,037 (both assigned to the present assignee) describe metallic instruments adapted with a toroidal coil and electrode system for obtaining resistivity measurements while drilling.

The measurement techniques described in the '285 and '037 patents entail inducing a current that travels in a path including the conductive support body and the formation.

U.S. Pat. Nos. 5,396,175, 3,388,325, 3,329,889, and 3,760,260 (all assigned to the present assignee) describe instruments equipped with electrode and/or coil configurations for obtaining subsurface measurements. U.S. Pat. No. 4,538,109 (assigned to the present assignee) describes a logging technique aimed at correcting or canceling the effects of spurious EM components on downhole measurement signals.

A coil or loop-type antenna carrying a current can be represented as a magnetic dipole having a magnetic moment of strength proportional to the current and the effective area of the coil. The direction of the magnetic moment vector is perpendicular to the plane of the coil. In conventional induction and propagation logging instruments, the transmitter and receiver antennas are mounted with their axes along the longitudinal axis of the instrument. Thus, these instruments are implemented with antennas having longitudinal magnetic dipoles (LMD). When such an antenna is placed in a borehole and energized to transmit EM energy, currents flow around the antenna in the borehole and in the surrounding formation. There is no net current flow up or down the borehole.

An emerging technique in the field of well logging is the use of instruments incorporating antennas having tilted or transverse coils, i.e., where the coil's axis is not parallel to the support axis. These instruments are thus implemented with antennas having a transverse or tilted magnetic dipole (TMD). The aim of these TMD configurations is to provide EM measurements with directed sensitivity and sensitivity to the anisotropic resistivity properties of the formation.

Logging instruments equipped with TMDs are described in U.S. Pat. Nos. 4,319,191, 4,360,777, 5,508,616, 5,115, 198, 5,757,191, 5,781,436, 6,044,325, 6,147,496, 6,163,155, and 6,181,138.

A particularly troublesome property of the TMD is the extremely large borehole effect that occurs in high contrast situations, i.e., when the mud in the borehole is much more conductive than the formation. When a TMD is placed in the center of a borehole, there is no net current the borehole axis. When it is eccentered in a direction parallel to the direction of the transverse component of the magnetic moment, the symmetry of the situation insures that there is still no net current along the borehole axis. However, when a TMD is eccentered in a direction perpendicular to the direction of the transverse component of the magnetic moment, axial currents are induced in the borehole. In high contrast situations these currents can flow for a very long distance along the borehole. When these currents pass by TMD receivers, they can cause undesired signals that are many times larger than would appear in a homogeneous formation without a borehole.

U.S. Pat. No. 5,041,975 (assigned to the present assignee) describes a technique for processing signal data from downhole measurements in an effort to correct for borehole effects. U.S. Pat. No. 5,058,077 describes a technique for processing downhole sensor data in an effort to compensate for the effect of off-center tool rotation while drilling. However, neither of these patents relates to the monitoring or assessment of these borehole effects to determine other subsurface or instrument parameters.

Thus there remains a need for techniques to detect or monitor the borehole effect when using well logging instruments implemented with TMDs. A need also remains for improved techniques to determine the orientation or position of such instruments within a borehole.

SUMMARY OF INVENTION

The invention provides an apparatus for making an electromagnetic measurement from within a subsurface borehole. The apparatus comprises an elongated support having electrically conductive segments and adapted for disposal within the borehole; an antenna adapted to transmit electromagnetic energy disposed on the support such that its axis is tilted or perpendicular with respect to the axis of the support; a sensor disposed on the support and adapted to detect a current flow along the support when the antenna is activated to transmit electromagnetic energy; and means to process the detected current flow to provide an indication of the measurement quality or the position of the support within the borehole.

The invention provides a method for making an electromagnetic measurement from within a subsurface borehole using an elongated support having electrically conductive segments and adapted for disposal within the borehole. The method comprises transmitting electromagnetic energy from an antenna disposed on the support such that its axis is tilted or perpendicular with respect to the axis of the support; detecting a current flow along the support with a sensor disposed thereon, the current flow associated with the transmitted energy; and processing the detected current flow to provide an indication of the measurement quality or the position of the support within the borehole.

A system for making an electromagnetic measurement from within a subsurface borehole. The system comprises an elongated support having electrically conductive segments and adapted for disposal within the borehole; a plurality of antennas adapted to transmit or receive electromagnetic energy disposed on the support such that the axis of each antenna is tilted or perpendicular with respect to the axis of the support; at least one sensor disposed on the support and adapted to detect a current flow along the support; and means to process the detected flow to provide an indication of the measurement quality or the position of the support within the borehole.

BRIEF DESCRIPTION OF DRAWINGS

Other aspects and advantages of the invention will become apparent upon reading the following detailed description and upon reference to the drawings in which.

DETAILED DESCRIPTION

Before proceeding with disclosure of the invention, some theoretical consideration shall be set forth.

Figure 1:
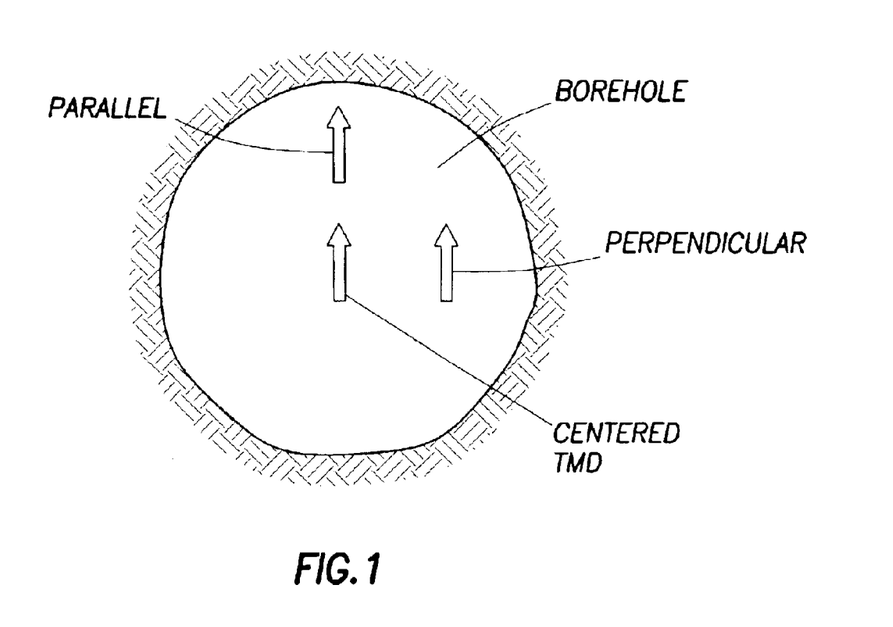
FIG. 1 shows a pictorial looking downhole of parallel and perpendicular eccentering of a tilted or transverse magnetic dipole within a borehole.

A TMD can be eccentered in a borehole in two possible orientations, which we will call parallel and perpendicular eccentering as shown in FIG. 1. A TMD eccentered in a borehole in a direction along the direction of the dipole moment is parallel eccentered. With parallel eccentering currents flow up one side of the borehole and down the other in a symmetric manner. There is no net current in the borehole past the transmitter. This localized current causes a dipole field just as with an LMD. When the TMD is eccentered in a direction perpendicular to the direction of the transverse component of the dipole moment, these axial currents are no longer symmetric and a net current flows in the borehole past the transmitter. This current flows along the borehole and returns through the formation. When the borehole is much more conductive than the formation, this current falls of very slowly. If this current passes a transverse receiver, a voltage is induced in the receiver. These two displacements are the extremes of the possible ones. In the general case, the eccentering will be in a direction that is at some angle to the dipole moment of the sensors. In this case, the borehole effect lies between the two extreme cases.

It is important to understand the basic difference between the borehole effect of a conventional LMD and the borehole effect of a TMD. If either type of source is placed in a homogeneous medium, currents will flow in paths surrounding the transmitter. These currents induce a voltage in a receiver coil spaced apart from the transmitter. This voltage is an indication of the resistivity of the formation. If instead of a homogeneous medium, we include a borehole, then the current paths are altered and hence the received voltage is different from what would be measured in the absence of a borehole. This difference is called the "borehole effect." The difference in borehole effect between an LMD and a TMD is due to the difference between the distortion of the currents in the presence of a borehole. With an LMD centered or eccentered in a borehole, these currents flow in the borehole in a region near the transmitter.

In the case of an LMD, or a parallel eccentered TMD, the voltage in the receiver is due to the fields from the localized distortion of the current distribution near the transmitter. In the case of a perpendicularly eccentered TMD, it is due to the field from the current traveling in the borehole right past the receiver. This second effect is much larger than the first and is not localized about the TMD.

Figure 2:
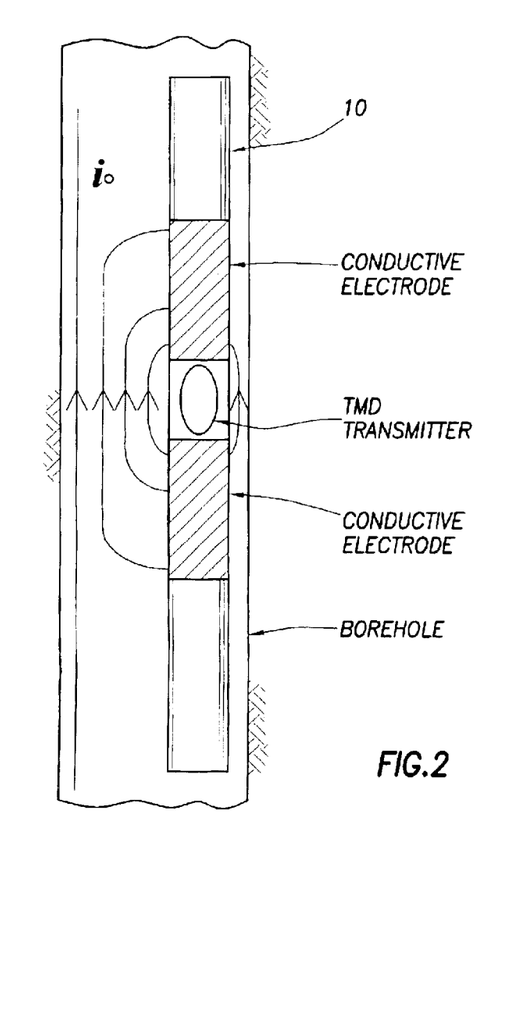
FIG. 2 is a schematic diagram of the current flow within a borehole about an eccentered instrument equipped with an antenna having a tilted or transverse axis.

If the TMD is disposed on a conductive support, the borehole currents will close through the support and the current is localized near the TMD. If instead of having a fully conductive support, we have one with only a finite length conductive segment about the TMD, then for large boreholes only some of the current will return to the conductive segment. The rest will continue past the end of the conductive segment, resulting in incomplete cancellation of the borehole effect. The distance over which the currents fall off increases with the diameter of the borehole. This condition is shown in FIG. 2. A related discussion is presented in published U.S. patent application Ser. No. 20,020,105,332 A1, published Aug. 8, 2002 and assigned to the present assignee.

Analysis has shown that in a conductive borehole, the effect of perpendicular eccentricity is at least two orders of magnitude higher than for parallel eccentricity. The cause of that phenomenon is appearance of zero th order Transverse Magnetic modes ($TM_{0,n}$), corresponding to the longitudinal current flowing in the borehole. The current due to perpendicular TMD eccentricity is equal to current due to parallel TMD eccentricity, corresponding to the first order mode $TM_{1,n}$, plus a constant term corresponding to zero th order mode ($TM_{0,n}$).

Figure 3:
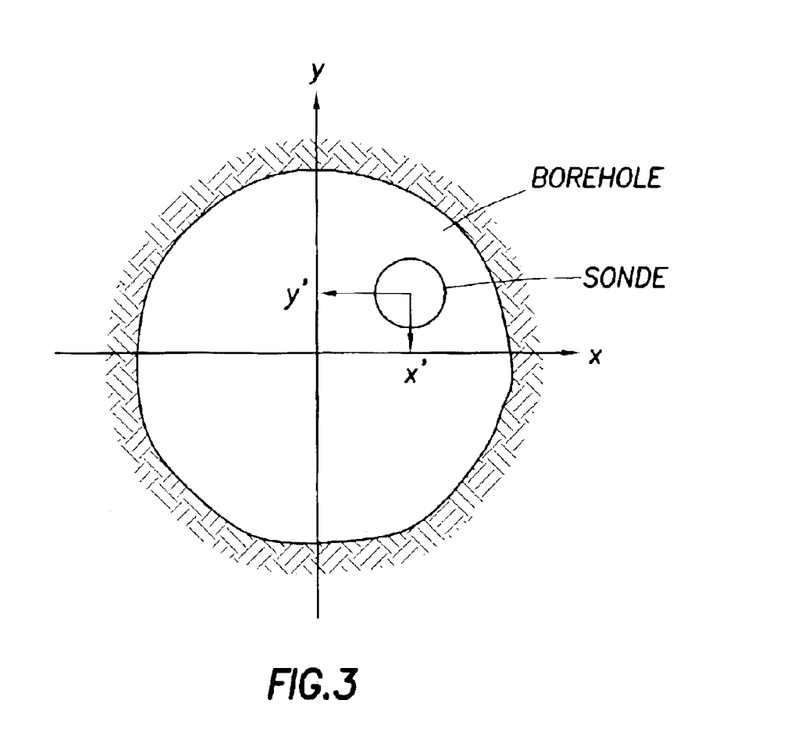
FIG. 3 shows a pictorial looking downhole of an instrument eccentered within a borehole.

Supposing a TMD transmitter includes a magnetic moment oriented in the X-coordinate direction and another oriented in the Y-coordinate direction. Then, as explained with reference to FIG. 1, the difference between parallel and perpendicular eccentering of the respective magnetic moments is determinative of the borehole effect. Thus when taking subsurface measurements with such a transmitter, one needs to know if the transmitter is perpendicular eccentered in the X-moment or perpendicular eccentered in the Y-moment to determine if the borehole effect has affected the measurement. As illustrated in FIG. 3, the determination of X' and Y' is important to determine how the sonde is eccentered in the borehole. By monitoring and measuring the current in the sonde, one can determine various parameters including the sonde position/orientation within the borehole.

The attributes of the invention can be categorized by the information provided. For instance, knowing the sonde position within the borehole is useful for inversion, and, moreover it allows one to determine if inversion should be undertaken at all. Knowing when the sonde is so eccentered that inversion is pointless provides for bad log detection. The current measurement techniques of the invention also allow one to estimate the borehole size. Thus the invention has several aspects which are described herein.

Figure 4:
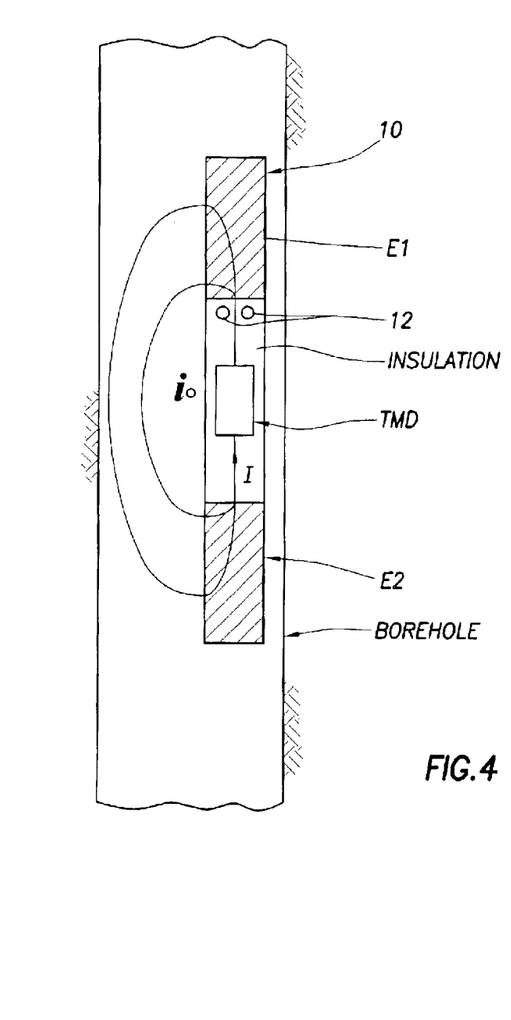
FIG. 4 is a schematic diagram of an instrument with a TMD antenna and a toroidal sensor configuration according to the invention.

FIG. 4 shows an embodiment of the invention. A sonde consisting of a support 10 having a TMD transmitter disposed between two conductive segments or electrodes E1, E2 is shown eccentered within a borehole. The flow of current ($i_0$) resulting from the eccentered TMD is shown as lines. The TMD transmitter region is covered with insulation to protect the antenna from the downhole environment while permitting the passage of electromagnetic energy. The conductive segments or electrodes E1, E2 are exposed to the borehole fluids above and below the transmitter. A toroid 12 is mounted on the support 10 near the TMD transmitter to monitor current flowing in the support. The toroid 12 is also covered by the insulation to prevent direct exposure to the borehole environment. As known in the art, shielding material may also be placed near the toroid with the embodiments of the invention to prevent direct EM coupling with the transmitter (not shown). Conventional toroids 12 and electronics may be used to implement the embodiments of the invention as known in the art.

When the support 10 is eccentered, the borehole effect will cause a current/to flow along the conductive support. This measured current is:

$$I = i\omega\mu\sigma_m M f(\sigma_f, d, x, y, z) \quad (1)$$

where $\omega$ is the angular frequency, M is the transmitter moment, $\sigma_m$ is the borehole fluid conductivity, $\sigma_f$ is the local formation conductivity, and d is the borehole diameter. $f(\sigma_f, d, x, y, z)$ is the functional form of the dependence of the current in the electrode at a distance z from the transmitter.

By relating the measured current logs to their respective magnetic moments, one can invert the logs using known parameters (i.e., the borehole fluid conductivity $\sigma_m$, the formation conductivity $\sigma_f$, the distance from the transmitter to the toroid z, and the borehole diameter d) to solve for the position/orientation (X', Y') of the support 10 within the borehole. Conventional inversion techniques may be used as known in the art. It should be noted that when the ratio of the borehole fluid conductivity $\sigma_m$ to the formation conductivity $\sigma_f$ is high, for example when using conductive mud, then the formation conductivity $\sigma_f$ is of little importance. This type of current monitor provides a measure of how well centered the support 10 is within the wellbore.

Figure 5:
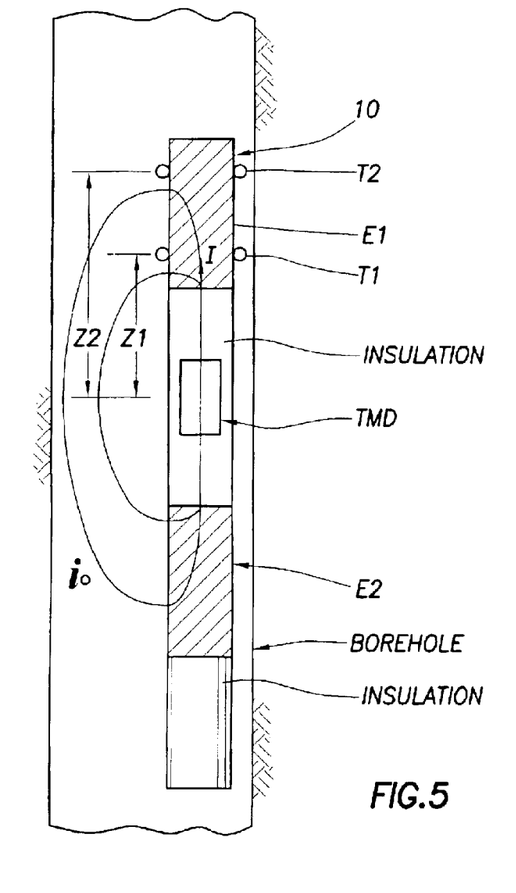
FIG. 5 is a schematic diagram of an instrument with a TMD antenna and a plurality of toroidal sensors according to the invention.

FIG. 5 shows another embodiment of the invention. In this embodiment, the support 10 includes two toroids T1, T2 disposed near the TMD transmitter, which is positioned between two conductive segments E1, E2 and covered with protective insulation. The toroids T1, T2 are respectively disposed on the electrode E1 at spacings of $Z_1$ and $Z_2$ from the TMD antenna. The differential measurement of the current I measured at toroids T1 and T2 to their spacings $Z_1$ and $Z_2$ (i.e. dI/dz) provides another way to apply equation (1) with reduced parameters to solve for the borehole size, the support position/orientation, or the log quality. U.S. Pat. No. 6,373,254 (assigned to the present assignee) describes toroid configurations and that may be used to implement the invention. The toroids T1, T2 may be placed on eLectrode E2 instead of electrode E1 if desired (not shown). If the toroids are not disposed on the same electrode E1 or E2, the calculation of the current dissipation rate (dI/dz) may need some correction by taking into account the length ohbe conductive segment between the sensors.

Figure 6:
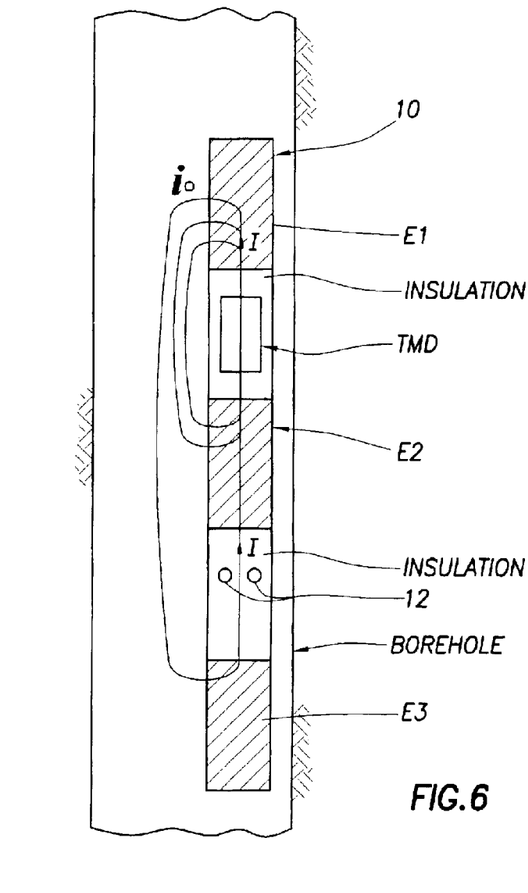
FIG. 6 is a schematic diagram of an instrument with a TMD antenna, toroidal sensor, and multiple electrodes configured in accord with the invention.

FIG. 6 shows another embodiment of the invention. In this embodiment, the TMD transmitter is disposed between the electrodes E1, E2 and includes an additional electrode E3 spaced apart from the TMD along with the toroid 12. The TMD region is again covered with protective insulation. The toroid 12 is also covered with insulation to prevent direct exposure to the borehole environment. The third electrode E3 is exposed to the borehole environment. While not shown for clarity of illustration, an array of receiver antennas is typically placed on electrode segments E2, E3 and under the insulated region about the toroid 12. The current detected at the toroid 12 provides an indicator of the measured log quality. A normal "noise" measurement indicates a good log while a measured current indicates a bad or corrupted log. in essence, this configuration provides a bad log indicator by detecting a current signal or circuit noise along the support. That is, $I_{Measured} > I_{Noise} = 0$ (good log) or 1 (corrupt log), where $I_{Measured}$ is the measured current and $I_{Noise}$ is a predefined current value.

Figure 7:
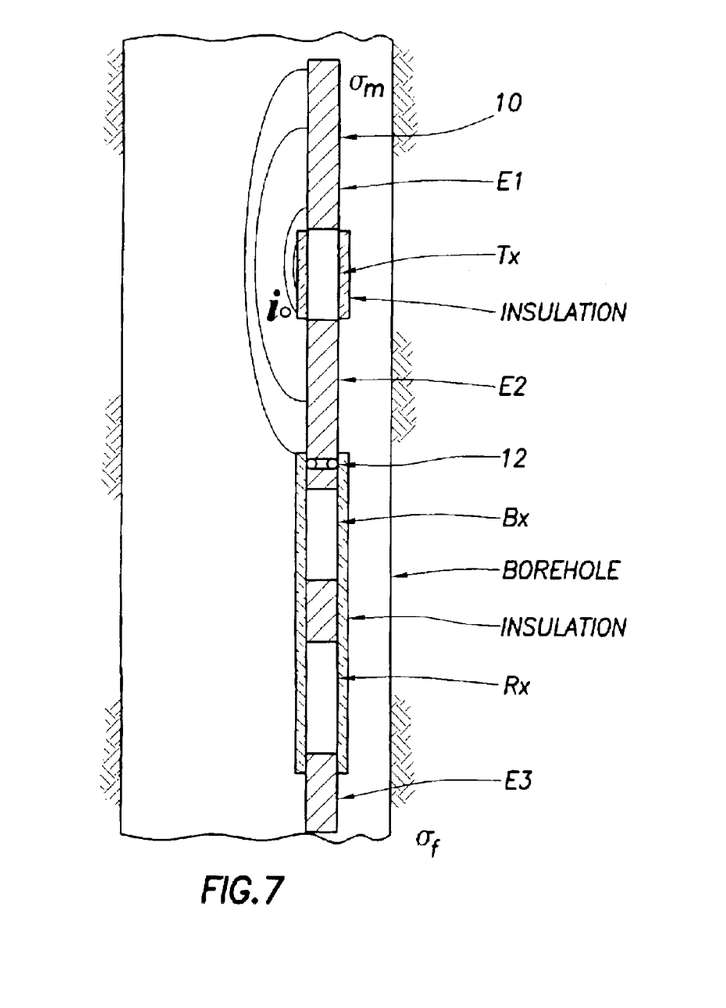
FIG. 7 is a schematic diagram of an instrument with TMD antennas and a toroidal sensor configuration according to the invention.

FIG. 7 shows another embodiment of the invention. The support 10 is equipped with TMD antennas including a transmitter antenna Tx and a receiver antenna Rx. The support also includes a bucking antenna Bx, which is used to eliminate or reduce direct transmitter-to-receiver coupling effects as known in the art. The transmitter Tx and receiver Rx regions are also covered with insulation. Segments of the conductive support or electrodes are exposed to the mud above and below the transmitter Tx and below the receiver Rx. A toroid 12 is mounted on the support 10 between the two bottom electrodes E2, E3 to monitor current flowing in the support. The toroid 12 is also covered with insulation to prevent direct exposure to the borehole environment and to shield it from EM radiation from the transmitter Tx.

In FIG. 7 the borehole diameter is comparable to the electrode E1, E2 length and the current $i_0$ is observed to close locally about the transmitter Tx through the electrodes.

Figure 8:
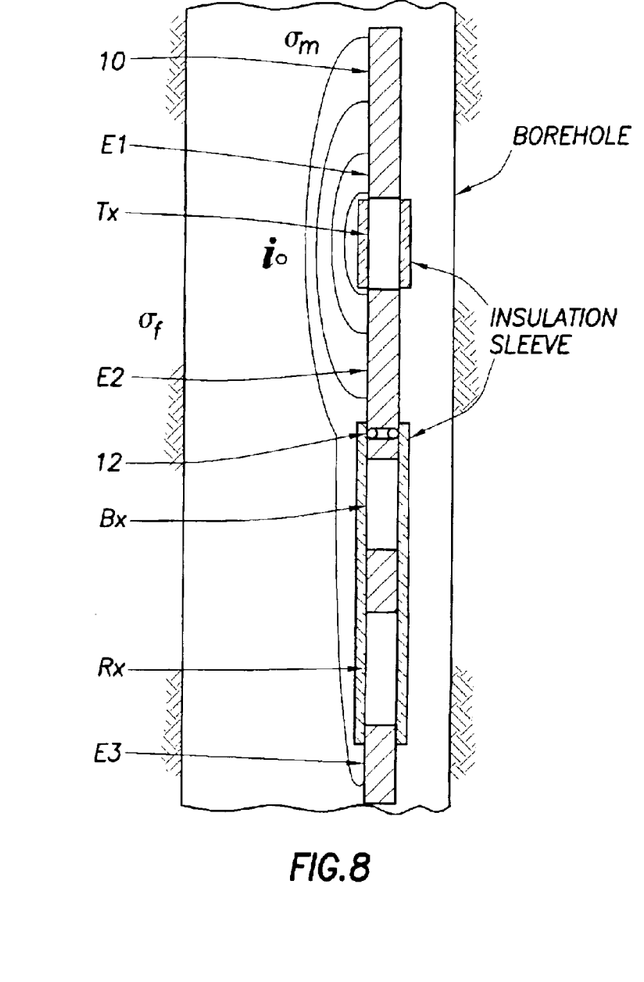
FIG. 8 is a schematic diagram of the instrument of FIG. 7 disposed within a large diameter borehole.

FIG. 8 shows a support 10 of the invention eccentered in a borehole where the diameter is larger than the electrode E1, E2 length and not all of the induced axial current is shorted locally. Some percentage of the current is observed to continue down to the far electrode E3, where it is grounded in to the conductive support. This current then couples electromagnetically to the toroid 12 as it completes its circuit path through the support and out the upper electrode E1. The toroid 12 acts as an N to 1 turn transformer. Thus a current in the toroid 12 proportional to the current in the support 10 will be excited when the support is eccentered and/or when the electrode E1, E2 is not long enough to short all the borehole current. This particular embodiment illustrates the antennas mounted on an entirely conductive support 10. Other embodiments of the invention may be implemented with conductive segments or electrodes disposed on a non-conductive support with the conductive segments/electrodes electrically connected to one another to form a conductive path through the antenna array (not shown).

The dependence of current in the conductive support was analyzed as a function of distance from the transmitter Tx, borehole size, eccentering, and mud and formation conductivity. The current fall-off is generally a weak function of support position (for the same orientation), it is primarily defined by the borehole size and the conductivity contrast. With regard to the dependence of current in the support for different conductivity contrasts and borehole conductivity, the results demonstrate that current peak (near the transmitter) is defined primarily by the borehole conductivity, while fall-off is defined by borehole size and conductivity contrast. With regard to the current dependence on support eccentering, the results showed the eccentering effect for a short electrode would be nearly proportional to the conductivity contrast. With regard to current dependence on borehole size, the current varies nearly linearly with the borehole size. Therefore, a detected current in the toroid 12 indicates that the borehole current has compromised the TMD receiver measurement.

Figure 9:
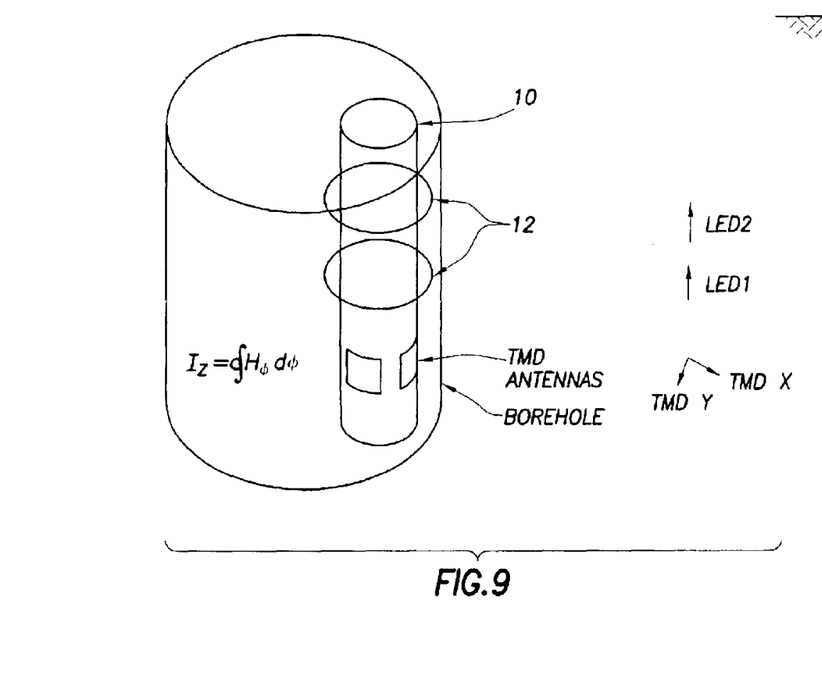
FIG. 9 is a schematic diagram of an instrument equipped with dual toroidal sensors according to the invention.

As previously mentioned, measurement of the current along the support 10 provides for an estimate of the borehole size in addition to sonde position and orientation within the borehole. By measuring the relative change in current flowing in the support, the borehole size is defined by the current slope. FIG. 9 shows another embodiment of the invention for measuring the current flow along the support 10. In actual application, the conductive segment between the two toroids 12 should be in contact with the borehole mud, otherwise both toroids measure the same current. In the dipole representation of the embodiment (on the right of FIG. 9), the toroids are represented by longitudinal electric dipoles, (LED 1, 2), and the TMD antennas by transverse magnetic dipoles TMD X,Y.

Thus by strategically placing a toroidal sensor about the TMD antenna(s), the invention allows one to monitor current flow along the support to provide useful information and take action to correct for the borehole eccentering effect. An operator can also log the severity of the borehole effect if desired.

The embodiments of the invention may be implemented with any conventional TMD antennas such as described in the aforementioned patents. FIG. 9 illustrates an embodiment using one particular type of antenna, known as a "saddle coil", to produce the TMDs. Saddle coil antennas are described in published U.S. patent application Ser. No. 20,010,004,212 A1, published Jun. 21, 2001 and assigned to the present assignee.

It will be apparent to those skilled in the art that the measurements of the invention may be implemented by programming one or more suitable general-purpose computers having appropriate hardware. The programming may be accomplished through the use of one or more program storage devices readable by the computer processor and encoding one or more programs of instructions executable by the computer for performing the operations described herein. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code", i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

Figure 10:
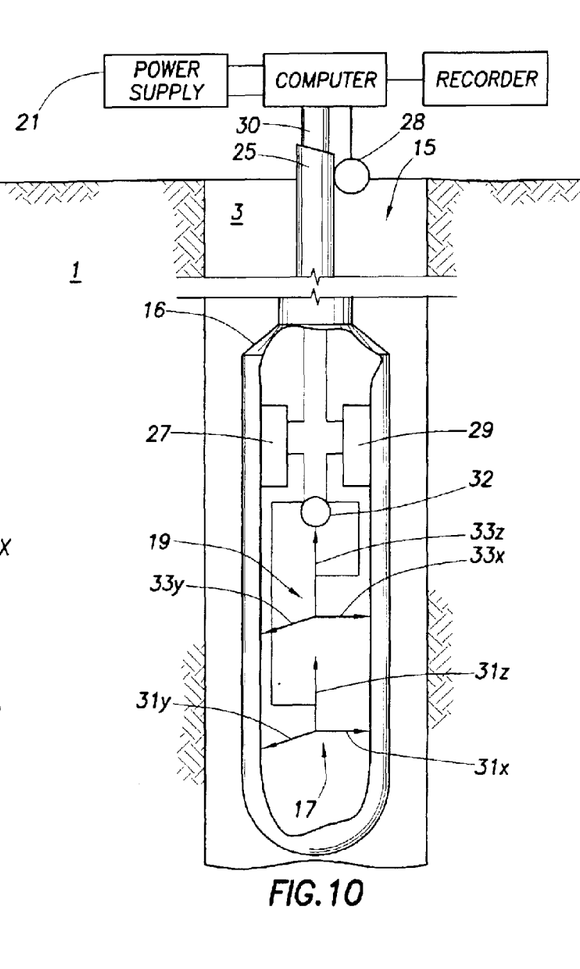
FIG. 10 shows an embodiment of the invention implemented in a logging system.

FIG. 10 shows an embodiment of the invention forming part of a logging system disposed in a borehole 3 that penetrates a subsurface formation 1. The system includes a support 16 having a triaxial transmitter antenna 19 and a triaxial receiver antenna 17. The triaxial receiver 17 is arranged such that its axes ($31_x$, $31_y$, and $31_z$) are substantially parallel with the magnetic moments ($33_x$, $33_y$, and $33_z$) of the triaxial transmitter 19. The support 16 includes a toroidal sensor 32 as described herein. The support 16 is shown suspended in the borehole 3 by an armored logging cable 25 in the case of a wireline system or a drill string 25 in the case of an LWD system. With a wireline tool, the support 16 is raised and lowered in the borehole 3 by a winch 28 which is controlled by the surface equipment 21. Logging cable or drill string 25 includes conductors 30 that connect the downhole electronics with the surface equipment 21. Downhole electronics comprise a transmitter circuit 27 and a receiver circuit 29. The transmitter circuit 27 controls current flows through the transmitter antenna 19 to generate magnetic moments $M_x$, $M_y$, and $M_z$. The receiver circuit 29 detects the voltage signals, associated with the EM energy transmitted by the magnetic moments, in the receiver antennas ($31_x$, $31_y$, $31_z$). In some embodiments, the transmitter and/or receiver could consist of multiple antennas with magnetic moments that are not perpendicular to each other, nor co-planar to one another (not shown).

Once acquired, the detected signal data may be stored and/or processed downhole by processing means disposed in the support or communicated to the surface equipment 21 via the wireline cable or LWD telemetry means. It will be understood that alternative means can be employed for communicating the data to the surface, as the precise form of communication is immaterial to implementation of the invention. The surface equipment 21 and/or the support 16 include a general-purpose computer and program storage device as described above. At the surface equipment 21, the data can be recorded, processed, or computed as desired by the user.

It will be appreciated by those skilled in the art that various suitable materials may be used to provide the insulating and shielding aspects of the invention as known in the art. Furthermore, the insulation may be implemented in the form of a sleeve disposed on the exterior of the instrument or as a coating or layer of nonconductive material providing transparency to EM energy. For the purposes of this specification it will be clearly understood that the word "comprising" means "including but not limited to", and that the word "comprises" has a corresponding meaning.

What is claimed is:

1. An apparatus for making an electromagnetic measurement from within a subsurface borehole, comprising:

an elongated support having electrically conductive segments and adapted for disposal within said borehole;

an antenna adapted to transmit electromagnetic energy disposed on the support such that its axis is tilted or perpendicular with respect to the axis of said support;

a sensor disposed on the support and adapted to detect a current flow along said support when said antenna is activated to transmit electromagnetic energy; and means to process the detected current flow to provide an indication of the measurement quality or the position of the support within said borehole.

2. The apparatus of claim 1, wherein said sensor is adapted with insulation to prevent its direct exposure to the borehole.

3. The apparatus of claim 2, wherein said sensor consists of a toroid.

4. The apparatus of claim 1, further comprising a second sensor disposed on the support and adapted to detect a current flow along said support.

5. The apparatus of claim 4, wherein said sensors are both disposed on an electrically conductive segment of said support.

6. The apparatus of claim 5, wherein said sensors each consist of toroids.

7. The apparatus of claim 1, wherein said processing means comprises means to determine the borehole size or the orientation of said support within said borehole.

8. The apparatus of claim 1, further comprising an antenna adapted to receive electromagnetic energy disposed on the support such that its axis is tilted or perpendicular with respect to the axis of said support.

9. The apparatus of claim 8, wherein the axis of said transmitter antenna is substantially aligned with the axis of said receiver antenna along said support.

10. The apparatus of claim 8, wherein said transmitter antenna or said receiver antenna comprises a saddle coil or a plurality of coils having non-parallel axes.

11. The apparatus of claim 1, wherein said support is adapted for subsurface disposal on a wireline cable.

12. The apparatus of claim 1, wherein said support is adapted for subsurface disposal while drilling said borehole.

13. A method for making an electromagnetic measurement from within a subsurface borehole using an elongated support having electrically conductive segments and adapted for disposal within said borehole, comprising:

a) transmitting electromagnetic energy from an antenna disposed on the support such that its axis is tilted or perpendicular with respect to the axis of said support;

b) detecting a current flow along the support with a sensor disposed thereon, said current flow associated with the transmitted energy; and c) processing the detected current flow to provide an indication of the measurement quality or the position of the support within said borehole.

14. The method of claim 13, wherein said sensor is adapted with insulation to prevent its direct exposure to the borehole.

15. The method of claim 13, wherein the support includes an antenna adapted to receive electromagnetic energy, said receiver antenna disposed on the support with its axis tilted or perpendicular with respect to the axis of said support.

16. The method of claim 15, wherein said transmitter antenna or said receiver antenna comprises a saddle coil or a plurality of coils having non-parallel axes.

17. The method of claim 13, step (c) further comprising processing the detected current flow to determine the size of said borehole.

18. The method of claim 13, wherein said support includes a second sensor disposed thereon, the second sensor adapted to detect a current flow along the support.

19. The method of claim 18, wherein said first and second sensors each consist of toroids.

20. The method of claim 18, further comprising measuring a change in said current flow and using said measurement to determine the diameter of said borehole.

21. The method of claim 13, wherein step (c) comprises determining the orientation of said support within said borehole.

22. A system for making an electromagnetic measurement from within a subsurface borehole, comprising:

an elongated support having electrically conductive segments and adapted for disposal within said borehole;

a plurality of antennas adapted to transmit or receive electromagnetic energy disposed on the support such that the axis of each antenna is tilted or perpendicular with respect to the axis of said support;

at least one sensor disposed on the support and adapted to detect a current flow along said support; and means to process the detected current flow to provide an indication of the measurement quality or the position of the support within said borehole.

23. The system of claim 22, wherein each at least one sensor consists of a toroid.

24. The system of claim 22, wherein the axes of at least two antennas of said plurality of antennas are substantially aligned with each other along the support.

25. The system of claim 22, wherein said support is adapted for subsurface disposal on a wireline cable.

26. The system of claim 22, wherein said support is adapted for subsurface disposal while drilling said borehole.

27. The system of claim 22, wherein said support comprises a plurality of sensors disposed thereon, each sensor adapted to detect a current flow along said support.

28. The system of claim 22, wherein said processing means comprises means to determine the borehole size or the orientation of said support within said borehole.

29. The system of claim 22, wherein the at least one sensor is adapted with insulation to prevent its direct exposure to the borehole.

* * * * *